(12) United States Patent
Murrish et al.

(10) Patent No.: US 9,664,229 B2
(45) Date of Patent: May 30, 2017

(54) CONNECTING ROD

(71) Applicant: GM GLOBAL TECHNOLOGY OPERATIONS LLC, Detroit, MI (US)

(72) Inventors: Dale Edward Murrish, Troy, MI (US); Yuchuan Liu, Troy, MI (US); Thomas George Halka, Birch Run, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 781 days.

(21) Appl. No.: 13/871,117

(22) Filed: Apr. 26, 2013

(65) Prior Publication Data

US 2014/0318494 A1   Oct. 30, 2014

(51) Int. Cl.
*F02B 75/32* (2006.01)
*F16C 7/02* (2006.01)
*F16C 9/04* (2006.01)
*F16C 33/10* (2006.01)
*F16C 17/04* (2006.01)
*F16C 17/10* (2006.01)

(52) U.S. Cl.
CPC ............... *F16C 7/023* (2013.01); *F16C 9/04* (2013.01); *F16C 33/1075* (2013.01); *F16C 17/047* (2013.01); *F16C 17/10* (2013.01); *F16C 2360/22* (2013.01); *Y10T 74/2162* (2015.01)

(58) Field of Classification Search
USPC ...... 123/197.3, 197.4, 48 B, 78 E; 74/579 R, 74/579 E; 384/430, 216, 268, 270
See application file for complete search history.

(56) References Cited

U.S. PATENT DOCUMENTS

| 5,192,136 | A | 3/1993 | Thompson et al. |
| 2005/0098140 | A1 | 5/2005 | Endoh et al. |
| 2007/0209629 | A1* | 9/2007 | Minemura et al. ........ 123/197.3 |

FOREIGN PATENT DOCUMENTS

JP        08284945 A    11/1996

* cited by examiner

Primary Examiner — Hung Q Nguyen
Assistant Examiner — Ruben Picon-Feliciano
(74) Attorney, Agent, or Firm — Quinn IP Law

(57) ABSTRACT

A connecting rod for a device includes a rod having a large end, and a cap attached to the large end. The large end of the rod and the cap cooperate to define a first side surface and a second side surface disposed opposite to each other. The large end of the rod and the cap further define a crankshaft bore that extends along a crank axis between the first side surface and the second side surface. A thrust surface is defined by at least one of the first side surface or the second side surface, and is disposed on a thrust plane. The thrust surface includes at least one recessed region that extends inward away from the thrust plane of the thrust surface. Each of the thrust surfaces include ramps that extend between the recessed regions and the flat regions at the thrust plane of the thrust surface.

20 Claims, 4 Drawing Sheets

CONNECTING ROD

TECHNICAL FIELD

The invention generally relates to a connecting rod for an internal combustion engine.

BACKGROUND

A connecting rod includes a rod having a large end, and a cap attached to the large end of the rod. The large end of the rod and the cap cooperate to define a crankshaft bore that extends along a crank axis. A rod journal of a crankshaft extends through the crankshaft bore of the connecting rod. Side surfaces of the connecting rod define a thrust surface for engaging either another thrust surface of an adjacent connecting rod, or an adjacent shoulder of the rod journal.

SUMMARY

A connecting rod for an internal combustion engine, compressor, or other similar device is provided. The connecting rod includes a rod having a large end, and a cap attached to the large end of the rod. The large end of the rod and the cap cooperate to define a first side surface and a second side surface disposed opposite to each other. The large end of the rod and the cap further define a crankshaft bore that extends along a crank axis between the first side surface and the second side surface. A thrust surface is defined by at least one of the first side surface or the second side surface, and is disposed on a thrust plane. The thrust surface includes a plurality of recessed regions and a plurality of flat regions aligned along a thrust plane of the thrust surface. Each of the recessed regions includes a central portion that extends inward away from the thrust plane of the thrust surface. Each adjacent pair of the recessed regions is separated by one of the plurality of flat regions. Each of the recessed regions includes a first ramp that extends between an adjacent flat region and its respective central portion, and a second ramp that extends between an adjacent flat region and its respective central portion. The second ramp is disposed opposite the first ramp across the central portion of each respective recessed region.

A device is also provided. The device includes a crankshaft having a rod journal that extends along and is concentric about a crank axis. A shoulder is disposed at an axial end of the rod journal, and extends radially outward and away from the rod journal relative to the crank axis. A connecting rod is coupled to the crankshaft. The connecting rod includes a rod having a large end, and a cap attached to the large end of the rod. The large end of the rod and the cap cooperate to define a first side surface and a second side surface disposed opposite to each other. A crankshaft bore extends along and is concentric with the crank axis between the first side surface and the second side surface. The crankshaft passes through the crankshaft bore. A thrust surface is defined by one of the first side surface or the second side surface, and is disposed against the shoulder of the crankshaft. The thrust surface includes a plurality of recessed regions and a plurality of flat regions aligned along a thrust plane of the thrust surface. Each of the recessed regions includes a central portion that extends inward away from the thrust plane of the thrust surface. Each adjacent pair of the recessed regions is separated by one of the plurality of flat regions. Each of the recessed regions includes a first ramp that extends between an adjacent flat region and its respective central portion, and a second ramp that extends between an adjacent flat region and its respective central portion. The second ramp is disposed opposite the first ramp across the central portion of each respective recessed region.

Accordingly, the recessed regions of the thrust surface on the connecting rod increase the bearing load capacity of the connecting rod and the oil film thickness between the thrust surface and the shoulder of the crankshaft, or between adjacent connecting rods.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims. Furthermore, the invention may be described herein in terms of functional and/or logical block components and/or various processing steps. It should be realized that such block components may be realized by any number of hardware, software, and/or firmware components configured to perform the specified functions.

Figure 1:
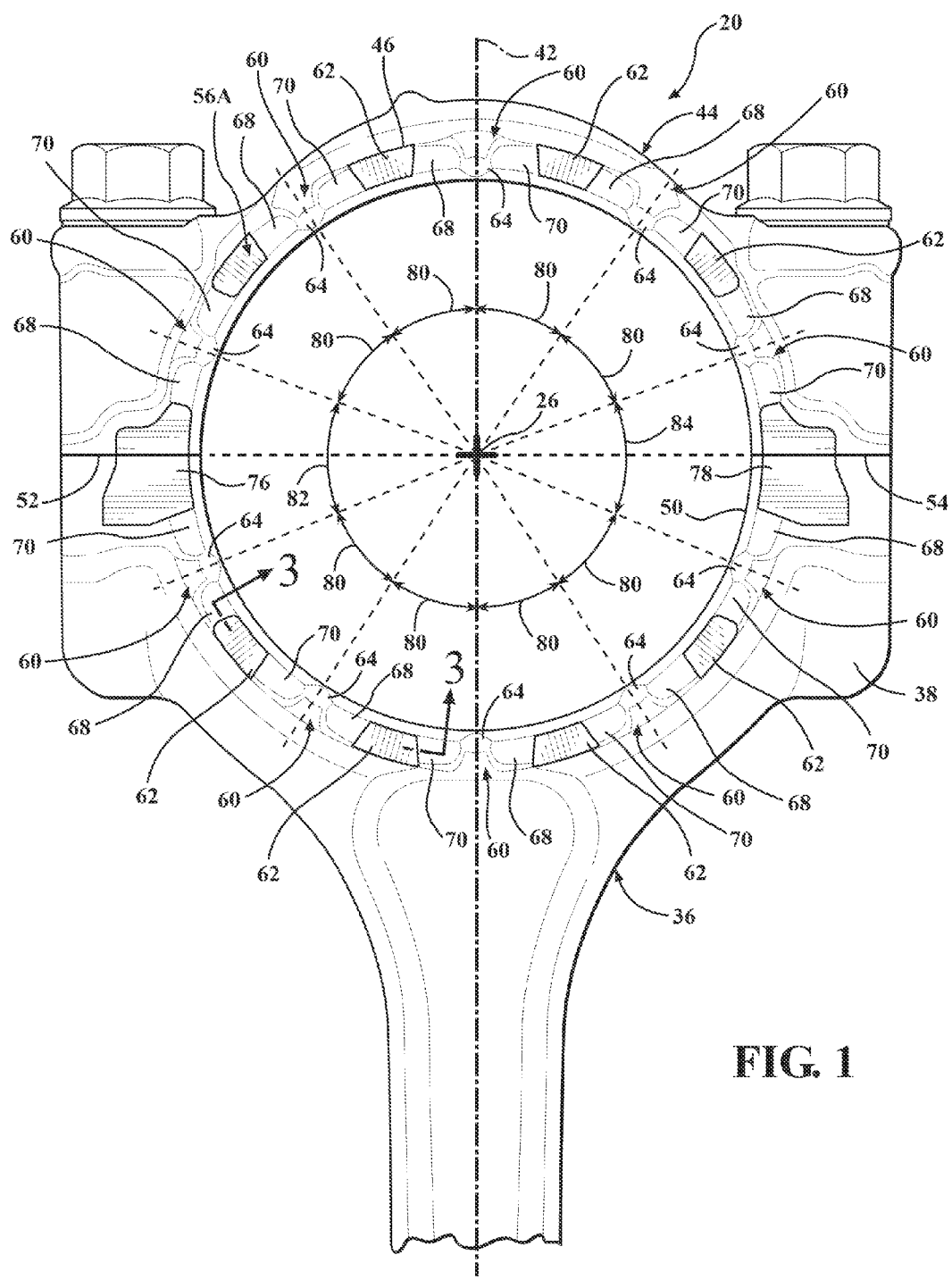
FIG. 1 is a schematic plan view of a connecting rod.

Referring to the Figures, wherein like numerals indicate like parts throughout the several views, a connecting rod is generally shown at 20 in FIG. 1. The connecting rod 20 is for an internal combustion engine, a compressor, or some other similar device. The connecting rod 20 connects a piston (not shown) to a crankshaft 22.

Figure 2:
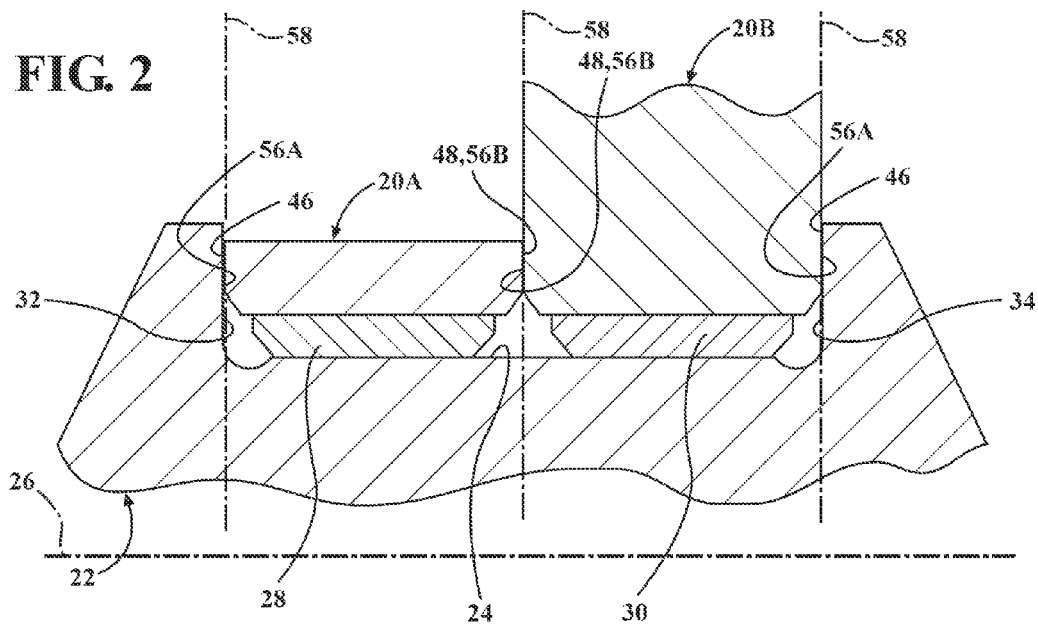
FIG. 2 is a schematic cross sectional view along a crank axis showing a crankshaft and two connecting rods of an internal combustion engine.

Referring to FIG. 2, the crankshaft 22 is shown having a first connecting rod 20A and a second connecting rod 20B attached to the crankshaft 22 adjacent to each other. The crankshaft 22 includes a rod journal 24 that extends along and is concentric about a crank axis 26. A first bearing 28 is disposed between the first connecting rod 20A and the rod journal 24, and a second bearing 30 is disposed between the second connecting rod 20B and the rod journal 24. The crankshaft 22 includes a shoulder that is disposed at an axial end of the rod journal 24. As shown in FIG. 2, the crankshaft 22 includes a first shoulder 32 and a second shoulder 34 axially spaced from each other along the crank axis 26 at opposite axial ends of the rod journal 24. Each of the first shoulder 32 and the second shoulder 34 extend radially outward and away from the rod journal 24 relative to the crank axis 26.

The first connecting rod 20A and the second connecting rod 20B are preferably identical. Accordingly, while the description of the connecting rod 20 below only refers to a single connecting rod, it should be appreciated that the written description applies to both the first connecting rod 20A and the second connecting rod 20B.

Referring to FIG. 1, the connecting rod 20 includes a rod 36 having a large end 38 and a small end (not shown). The small end is configured for attachment to the piston. The large end 38 is configured for attachment to the crankshaft 22. The rod 36 extends along a central rod axis 42. The crank axis 26 is perpendicular to and intersects the central rod axis 42.

A cap 44 is attached to the large end 38 of the rod 36. As is known in the art, the cap 44 is bolted to the large end 38 of the rod 36 to enclose the rod journal 24 of the crankshaft 22 between the large end 38 of the rod 36 and the cap 44. Referring also to FIG. 2, the large end 38 of the rod 36 and the cap 44 cooperate to define a first side surface 46 and a second side surface 48. The first side surface 46 and the second side surface 48 are disposed opposite to each other, and are arranged substantially perpendicular to the crank axis 26. The large end 38 of the rod 36 and the cap 44 further cooperate to define a crankshaft bore 50 that extends along the crank axis 26, between the first side surface 46 and the second side surface 48. The rod journal 24 of the crankshaft 22 is disposed between the large end 38 of the rod 36 and the cap 44, within the crankshaft bore 50. The cap 44 and the rod 36 contact each other along a first split line connection 52 and a second split line connection 54, which are disposed on opposite sides of the crankshaft bore 50.

A thrust surface 56 is defined by at least one of the first side surface 46 or the second side surface 48. The thrust surface 56 is disposed on a thrust plane 58, which is perpendicular to the crank axis 26. Preferably, and as shown in FIG. 2, the first side surface 46 defines a first thrust surface 56A, and the second side surface 48 defines a second thrust surface 56B. The first side surface 46 of each of the first connecting rod 20A and the second connecting rod 20B defines the first thrust surface 56A, which is disposed against the first shoulder 32 and the second shoulder 34 respectively. The second side surface 48 of each of the first connecting rod 20A and the second connecting rod 20B defines a second thrust surface 56B, which are disposed against each other.

The first thrust surface 56A and the second thrust surface 56B are preferably identical. Accordingly, while the description of the thrust surface 56 below only refers to a single thrust surface, it should be appreciated that the written description applies to both the first thrust surface 56A and the second thrust surface 56B.

Figure 3:
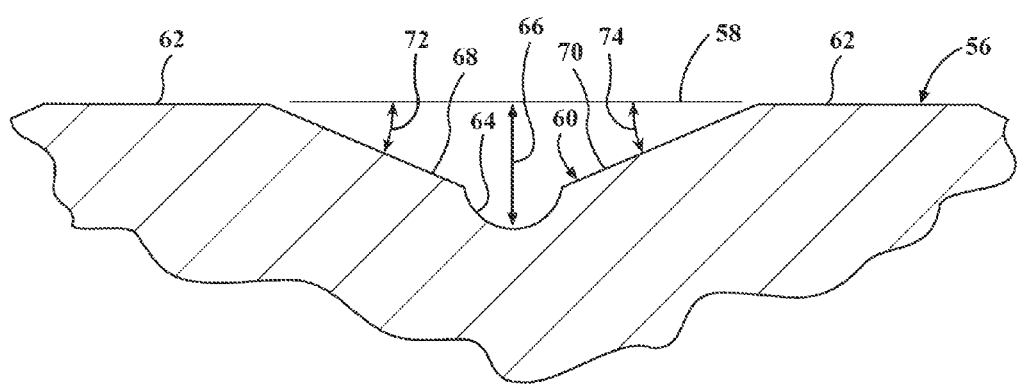
FIG. 3 is a fragmentary cross sectional view showing a thrust surface of the connecting rod.

Referring to FIGS. 1 and 3, the thrust surface 56 includes at least one recessed region 60, and at least one flat region 62 aligned along the thrust plane 58. The recessed region 60 extends inward away from the thrust plane 58 of the thrust surface 56. Preferably, the at least one recessed region 60 includes a plurality of recessed regions 60, and the at least one flat region 62 includes a plurality of flat regions 62. Each adjacent pair of the recessed regions 60 is separated by one of the flat regions 62. As shown in FIG. 1, the thrust surface 56 includes ten recessed regions 60 and ten flat regions 62, circumferentially arranged about the crank axis 26 in an alternating relationship. However, it should be appreciated that the thrust surface 56 may be configured differently than the exemplary embodiment shown in FIG. 1, and may include more or less than the ten recessed regions 60 and the ten flat regions 62 shown and described herein.

Referring also to FIG. 3, each of the recessed regions 60 includes a central region that extends inward away from the thrust plane of the thrust surface. As shown in FIGS. 1 and 3, the central region defines a groove 64 that extends radially outward from the crank axis 26, and extends completely across the thrust surface 56 in a radial direction relative to the crank axis 26. When referring to FIGS. 1 through 3, the central region is referred to as the groove 64. As shown in FIG. 3, the groove 64 of each of the recessed regions 60 defines a maximum distance 66 from the thrust plane 58 that is between the range of 30 microns and 1400 microns. As best shown in FIG. 3, each of the recessed regions 60 includes a first ramp 68 that extends between an adjacent flat region 62 and the groove 64, and a second ramp 70 that extends between another adjacent flat region 62 and the groove 64. The second ramp 70 is disposed opposite the first ramp 68 across the groove 64. The first ramp 68 defines a first angle 72 relative to the thrust plane 58 that is between the range of 0.1° and 5.0°. The second ramp 70 defines a second angle 74 relative to the thrust plane 58 that is between the range of 0.1° and 5.0°. As shown in FIG. 3, the first angle 72 may be equal to the second angle 74. However, it should be appreciated that the first angle 72 and the second angle 74 may be different, i.e., the first angle 72 may not be equal to the second angle 74.

As noted above and shown in FIG. 1, the exemplary embodiment of the thrust surface 56 includes ten recessed regions 60 and ten flat regions 62 circumferentially spaced about the crank axis 26 in an alternating relationship. Referring to FIG. 1, the thrust surface 56 includes a first of the plurality of flat regions 62, generally indicated at 76, that is disposed at the first split line connection 52, such that the cap 44 and the rod 36 each define a portion of the first flat region 62. The thrust surface 56 includes a second of the plurality of flat regions 62, generally indicated at 78, that is disposed at the second split line connection 54, such that the cap 44 and the rod 36 each define a portion of the second flat region 78. All adjacent pairs of grooves 64, except the adjacent pair of grooves 64 disposed on opposite sides of the first flat region 76 and the adjacent pair of grooves 64 disposed on opposite sides of the second flat region 78, define an angle about the crank axis 26, indicated by reference numeral 80, that is equal to thirty four degrees (34°). The grooves 64 of the recessed regions 60 that are disposed adjacent to the first flat region 76 define an angle about the crank axis 26, indicated by reference numeral 82, that is equal to forty-four degrees) (44°). Similarly, the grooves 64 of the recessed regions 60 that are disposed adjacent to the second flat region 78 define an angle about the crank axis 26, designated by reference numeral 84, that is also equal to forty-four degrees) (44°). However, in an alternative embodiment not shown in the Figures, it should be appreciated that all adjacent pairs of grooves 64 may be equidistantly spaced from each other about the crank axis 26, with each adjacent pair of grooves 64 being separated by an equal angle about the crank axis 26.

Figure 4:
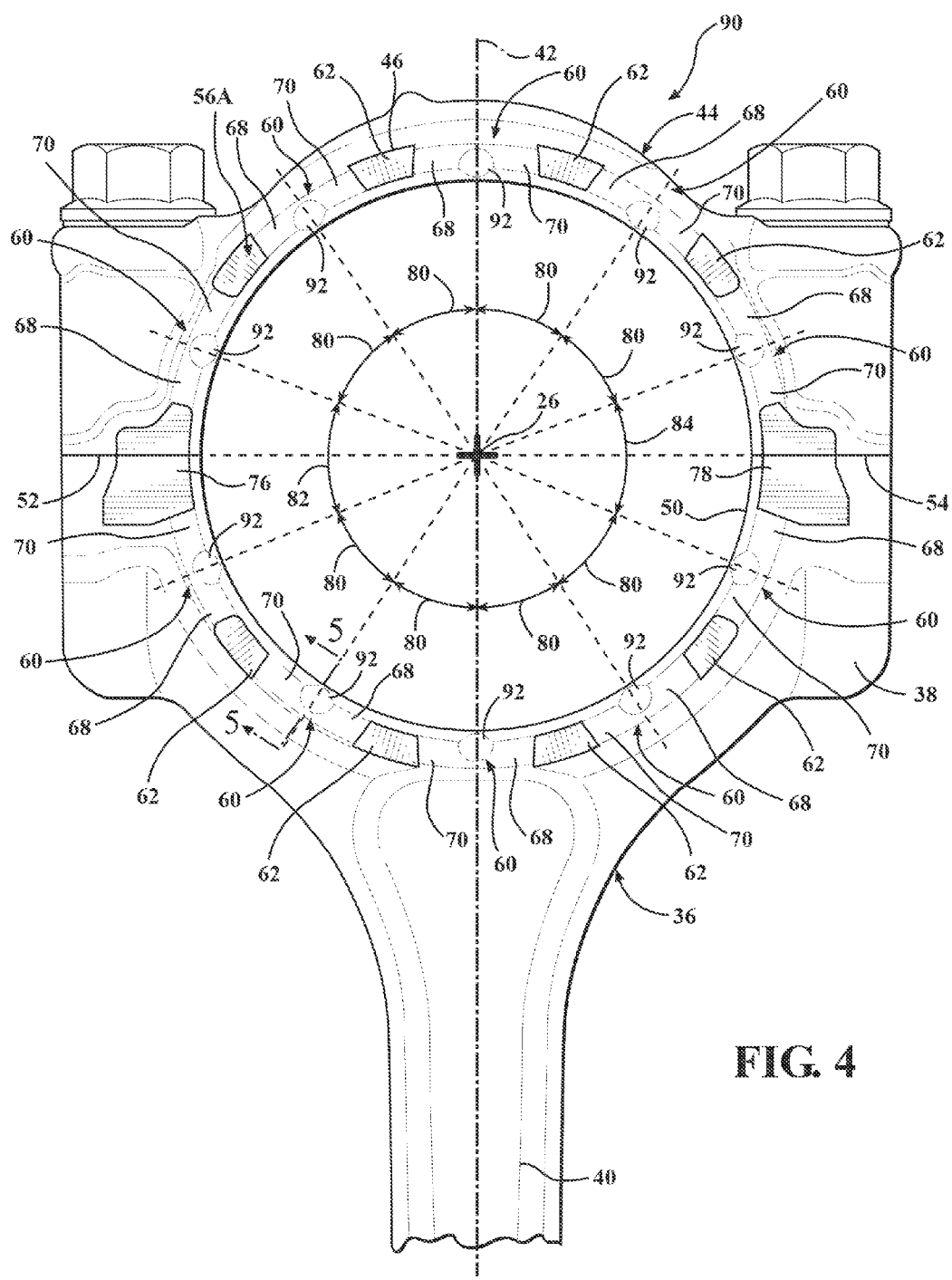
FIG. 4 is a schematic plan view of an alternative embodiment of the connecting rod.
Figure 5:
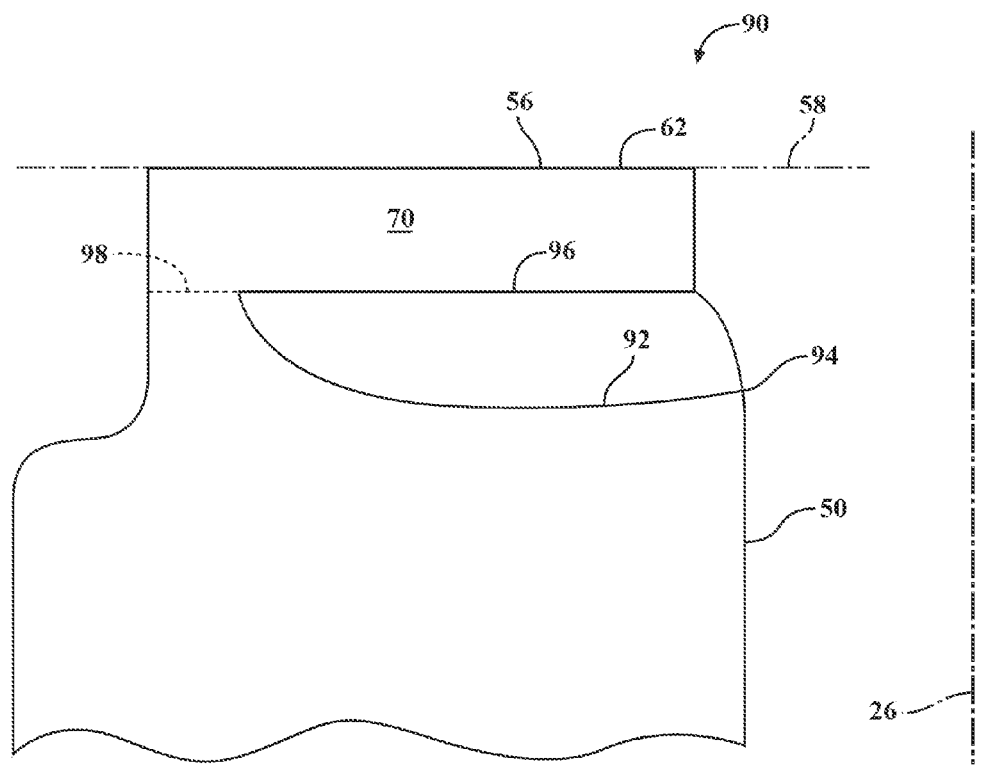
FIG. 5 is a fragmentary cross sectional view showing a thrust surface of the alternative embodiment of the connecting rod.

An alternative embodiment of the connecting rod is generally shown at 90 in FIGS. 4 and 5. Within FIGS. 4 and 5, similar features that are common with the features of the connecting rod 20 shown in FIGS. 1 through 3 are identified with the same reference numerals used in FIGS. 1 through 3. For example, the crank axis is referred to by reference numeral 26 in the embodiment of the connecting rod 20 shown in FIGS. 1 through 3, and the alternative embodiment of the connecting rod 90 shown in FIGS. 4 and 5.

The alternative embodiment of the connecting rod 90 is identical to the connecting rod 20, with the exception of the central portion of the recessed regions 60. Referring to FIGS. 4 and 5, the central region is formed to define a pseudo-spherical dimple 92 that extends radially outward from the crank axis 26, but does not extend completely across the thrust surface 56 in a radial direction relative to the crank axis 26. When referring to FIGS. 4 and 5, the central region is referred to as the pseudo-spherical dimple 92. The pseudo-spherical dimple 92 includes an inner radial edge 94 that is disposed adjacent to the crankshaft bore 50, and is spaced inward from the thrust surface 56. The pseudo-spherical dimple 92 further includes an outer radial edge 96 that tapers outward toward the thrust surface 56 to meet the first ramp 68 and the second ramp 70 to form a lower edge of the first ramp 68 and the second ramp 70. Because the pseudo-spherical dimple 92 does not extend completely across the thrust surface 56, the first ramp 68 and the second ramp 70 meet to form a bridge 98, disposed radially adjacent to the pseudo-spherical dimple 92.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A connecting rod comprising:
   a rod having a large end;
   a cap attached to the large end of the rod;
   wherein the large end of the rod and the cap cooperate to define a first side surface and a second side surface disposed opposite to each other, and a crankshaft bore extending along and concentric with a crank axis between the first side surface and the second side surface;
   wherein the first side surface and the second side surface are disposed parallel to each other and perpendicular to the crank axis;
   a thrust surface defined by at least one of the first side surface or the second side surface, wherein the thrust surface defines a thrust plane, and includes a plurality of recessed regions and a plurality of flat regions aligned relative to the thrust plane of the thrust surface, with each recessed region including a central portion spaced inward away from the thrust plane of the thrust surface along the crank axis, and with each adjacent pair of the recessed regions separated by one of the plurality of flat regions; and
   wherein each of the recessed regions includes a first ramp extending between an adjacent flat region and its respective central portion.

2. A connecting rod as set forth in claim 1 wherein each of the recessed regions includes a second ramp extending between an adjacent flat region and its respective central portion, with the second ramp disposed opposite to the first ramp across the central portion of each respective recessed region.

3. A connecting rod as set forth in claim 1 wherein the central portion of each of the recessed regions includes a groove extending radially outward from the crank axis.

4. A connecting rod as set forth in claim 3 wherein the groove of each respective central region extends completely across the thrust surface in a radial direction relative to the crank axis.

5. A connecting rod as set forth in claim 1 wherein the central portion of each respective recessed region includes a pseudo-spherical dimple having an inner radial edge disposed adjacent to the crankshaft bore and spaced inward from the thrust surface, and an outer radial edge tapering outward toward the thrust surface.

6. A connecting rod as set forth in claim 5 wherein the outer radial edge of each of the pseudo-spherical dimples forms a lower edge of the first ramp and the second ramp of their respective recessed region.

7. A connecting rod as set forth in claim 6 wherein the pseudospherical dimple of each respective central region does not extend completely across the thrust surface in a radial direction relative to the crank axis.

8. A connecting rod as set forth in claim 2 wherein the central region of each of the recessed regions defines a maximum distance from the thrust plane between the range of 30 microns and 1400 microns.

9. A connecting rod as set forth in claim 2 wherein the first ramp defines a first angle relative to the thrust plane between the range of 0.1° and 5.0°, and the second ramp defines a second angle relative to the thrust plane between the range of 0.1° and 5.0°.

10. A connecting rod as set forth in claim 1 wherein the cap and the rod contact each other along a first split line connection and a second split line connection, wherein the first split line connection and the second split line connection are disposed on opposite sides of the crankshaft bore, and wherein the thrust surface includes a first of the plurality of flat regions disposed at the first split line connection such that the cap and the rod each define a portion of the first flat region, and a second of the plurality of flat regions disposed at the second split line connection such that the cap and the rod each define a portion of the second flat region.

11. A connecting rod as set forth in claim 10 wherein the thrust surface includes ten recessed regions and ten flat regions circumferentially spaced about the crank axis in an alternating relationship.

12. A connecting rod as set forth in claim 11 wherein all adjacent pairs of central regions, except the adjacent pair of central regions disposed on opposite sides of the first flat region and the adjacent pair of central regions disposed on opposite sides of the second flat region, define an angle about the crank axis that is equal to thirty-four degrees) (34°).

13. A connecting rod as set forth in claim 12 wherein the central regions of the respective recessed regions adjacent to the first flat region define an angle about the crank axis equal to forty-four degrees(44°), and wherein the central regions of the respective recessed regions adjacent to the second flat region define an angle about the crank axis equal to forty-four degrees)(44°).

14. A device comprising:
   a crankshaft including a rod journal extending along and concentric about a crank axis, and a shoulder disposed at an axial end of the rod journal and extending radially outward and away from the rod journal relative to the crank axis;
   a connecting rod coupled to the crankshaft, the connecting rod including:
      a rod having a large end;
      a cap attached to the large end of the rod;
      wherein the large end of the rod and the cap cooperate to define a first side surface and a second side surface disposed opposite to each other, and a crankshaft bore extending along and concentric with the crank axis between the first side surface and the second side surface, wherein the crankshaft passes through the crankshaft bore;
      wherein the first side surface and the second side surface are disposed parallel to each other and perpendicular to the crank axis;
      a thrust surface defined by at least one of the first side surface or the second side surface, and disposed against the shoulder of the crankshaft;

wherein the thrust surface defines a thrust plane disposed perpendicular to the crank axis, and includes a plurality of recessed regions and a plurality of flat regions aligned relative to the thrust plane of the thrust surface, with each recessed region including a central portion extending inward away from the thrust plane of the thrust surface along the crank axis, and with each adjacent pair of the recessed regions separated by one of the plurality of flat regions; and wherein each of the recessed regions includes a first ramp extending between an adjacent flat region and its respective central portion.

15. An internal combustion engine as set forth in claim 14 wherein each of the recessed regions includes a second ramp extending between an adjacent flat region and its respective central portion, with the second ramp disposed opposite the first ramp across the central portion of each respective recessed region.

16. An internal combustion engine as set forth in claim 14 wherein the central portion of each of the recessed regions includes a groove extending radially outward from the crank axis.

17. An internal combustion engine as set forth in claim 14 wherein the central portion of each respective recessed region includes a pseudo-spherical dimple having an inner radial edge disposed adjacent the crankshaft bore and spaced inward from the thrust surface, and an outer radial edge tapering outward toward the thrust surface.

18. An internal combustion engine as set forth in claim 14 wherein the connecting rod includes a first connecting rod and a second connecting rod disposed adjacent to each other, wherein the shoulder includes a first shoulder and a second shoulder axially spaced from each other along the crank axis, and wherein the first side surface of each of the first connecting rod and the second connecting rod defines a first thrust surface disposed against the first shoulder and the second shoulder respectively, and the second side surface of each of the first connecting rod and the second connecting rod defines a second thrust surface disposed against each other.

19. A connecting rod as set forth in claim 1 wherein each of the plurality of recessed regions only partially extend between the first side surface and the second side surface along the crank axis.

20. An internal combustion engine as set forth in claim 14 wherein each of the plurality of recessed regions only partially extend between the first side surface and the second side surface along the crank axis.

* * * * *